United States Patent [19]
Owsen

[11] Patent Number: 4,546,681
[45] Date of Patent: Oct. 15, 1985

[54] MULTI-PURPOSE STEADY REST

[76] Inventor: Paul J. Owsen, 1772 Indian Woods Dr., Traverse City, Mich. 49684

[21] Appl. No.: 441,702

[22] Filed: Nov. 15, 1982

[51] Int. Cl.⁴ ............................................. B23B 25/00
[52] U.S. Cl. ...................................... 82/38 R; 82/39; 82/101
[58] Field of Search ......................... 82/38 R, 39, 101; 51/238 S, 227 R, 217 T, 236; 269/88, 48.1

[56] References Cited

U.S. PATENT DOCUMENTS

| | | | |
|---|---|---|---|
| 944,630 | 12/1909 | McCullough | 82/39 |
| 2,791,928 | 5/1957 | Saddoris | 82/38 R |
| 3,535,963 | 10/1970 | Dietl | 82/38 R |
| 3,777,097 | 12/1973 | Budzinski | 269/48.1 |
| 4,388,027 | 6/1983 | Blaimschein | 82/39 |
| 4,399,639 | 8/1983 | Lessway | 82/38 R |

FOREIGN PATENT DOCUMENTS 376202 of 1973 U.S.S.R. .................................. 82/39

Primary Examiner—Leonidas Vlachos
Assistant Examiner—Jerry Kearns
Attorney, Agent, or Firm—Krass & Young

[57] ABSTRACT

A steady rest is disclosed for alternatively supporting the interanl and external surfaces of a tubular workpiece during a machining operation. Each outer end of a plurality of movable fingers includes first and second workpiece contact devices such as rollers. The second contact device is offset from the longitudinal axis of the finger so that it may engage the inner periphery of the workpiece. The opposite inner ends of the outer fingers ride in slots having opposing arcuate cam surfaces. One cam surface provides backup support for its finger when externally contacting the workpiece while the other cam surface insures stability when its finger is contacting the inner periphery of the workpiece.

5 Claims, 8 Drawing Figures

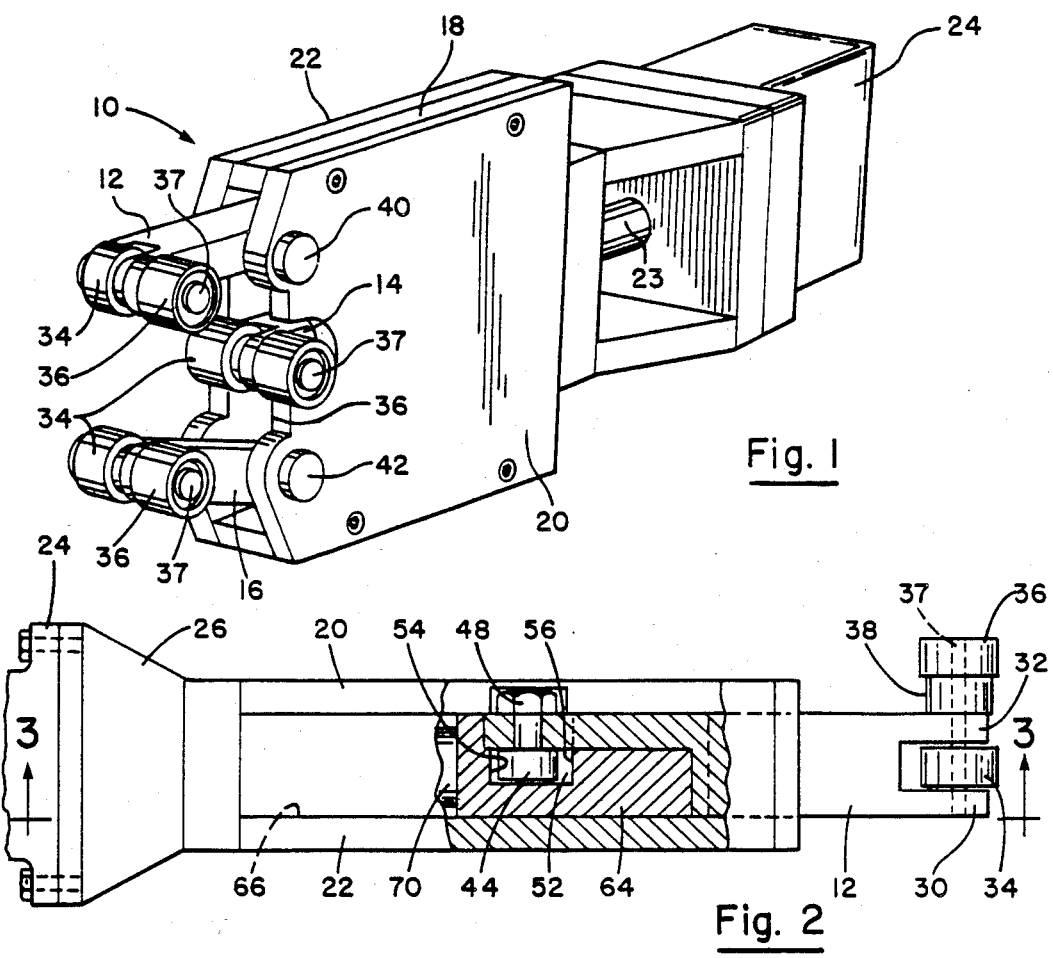
Fig. 1
Fig. 2
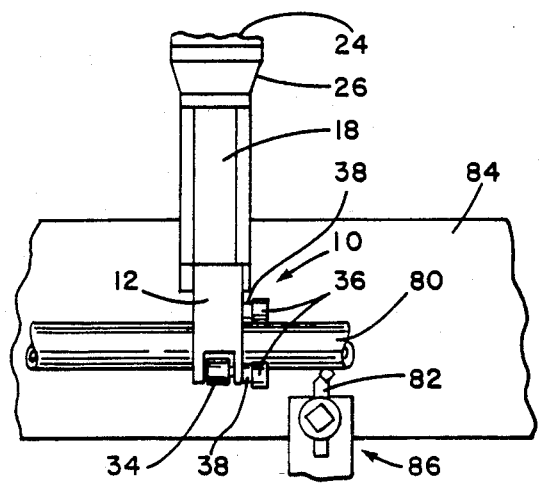
Fig. 5

MULTI-PURPOSE STEADY REST

TECHNICAL FIELD

This invention relates to machining equipment and more particularly, to steady rests or support structures for workpieces in machine tool systems.

BACKGROUND ART

Steady rests have been used for many years in connection with machining operations. They typically employ three hydraulically or pneumatically operated fingers which are adapted to concentrically support a shaft-like workpiece about its outer periphery to provide evenly distributed support for it. The steady rest serves to resist the tendency of the machine tool to throw the workpiece off center during machining by turning, grinding or the like. Exemplary steady rests are shown in U.S. Pat. Nos. 3,234,829 and 3,320,839 to Dinsmore, U.S. Pat. No. 2,547,529 to Lichtenberg, and U.S. Pat. No. 2,160,378 to Balsinger.

In the past, known steady rests have been designed only for use in contacting the outer periphery of the workpiece. Consequently, different mechanisms must be employed to support inner surfaces of the workpiece at its free end. When performing machining operations on solid bar stock it is possible to use the point of conventional dead centering devices to engage indentations in the end of the workpiece and hold it in place. With tubular workpieces, however, other techniques must be employed. The need to support the inner periphery of a tubular workpiece is especially important when a lathe is used to make a circumferential cut near the end of the workpiece. One commonly used support technique for tubular workpieces is to employ a plug to fill the open end of the tube. Unfortunately, these techniques take additional time thereby decreasing productivity, not to mention the expenditures required for procuring the different support devices.

The conventional steady rest assembly employs a hydraulic or pneumatic cylinder connected to the fingers. The cylinder must exert heavy pressure on the fingers during machining operations to prevent the part from going off center. This requirement for a constant and large amount of cylinder pressure is difficult to achieve in an economical manner.

SUMMARY OF THE INVENTION

According to the broad teachings of this invention a steady rest construction is provided that can be used for supporting internal as well as external surfaces of tubular workpieces during machining operations.

In the preferred embodiment, the steady rest employs a plurality of movable fingers, the end of each finger having a first workpiece contact means for engaging the outer periphery of the workpieces. A second workpiece contact means mounted to each finger offset from the longitudinal axis thereof is operative to engage the inner periphery of the workpiece. The workpiece contact means may take the form of rollers which are co-axially mounted by a common pin to the outer end of each finger.

Pursuant to a feature of this invention an improved camming arrangement is provided for controlling the movement of the fingers. The opposite inner ends of the outermost fingers ride in a slot having opposing arcuately shaped camming surfaces. The opposing camming surfaces serve to conteract forces applied to the workpiece engagement end of the fingers thereby holding the fingers rigidly in place in both the external and internal modes of use.

Another important feature of this invention is the use of a screw drive operated by a reversible electric motor, instead of conventional hydraulic or pneumatic cylinders, to control the opening and closing of the fingers. This arrangement provides superior back pressure for the fingers to prevent the part from going off center during machining operations.

BRIEF DESCRIPTION OF THE DRAWINGS

In the following specification reference will be made to the drawings in which:

FIG. 1 is a perspective view of the steady rest of the preferred embodiment;

FIG. 2 is a top plan view of the steady rest of FIG. 1 with parts cut away;

FIG. 5 is a top plan view showing the steady rest externally contacting a workpiece;

DESCRIPTION OF THE PREFERRED EMBODIMENT

Figure 4:
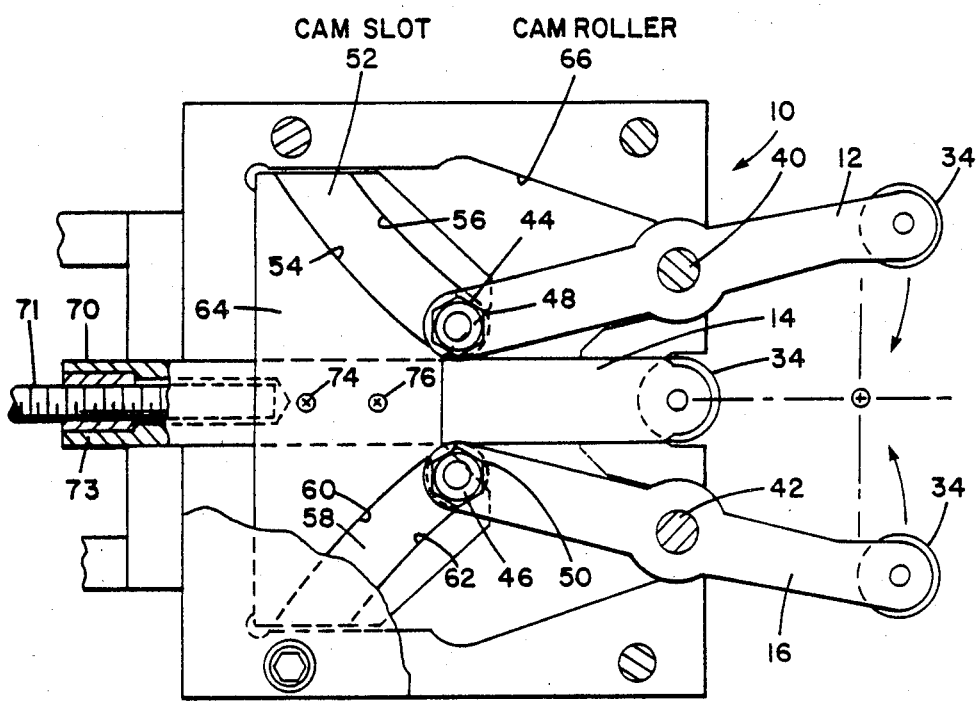
FIG. 4 is similar to FIG. 3 but shows the fingers fully open.

Turning now to the drawings, the steady rest 10 of the present invention employs a set of three movable fingers 12, 14 and 16 extending from an end of a generally disk shaped housing 18 having two side covers 20 and 22. As will appear, the housing 18 contains an internal camming arrangement cooperating with the inner portions of fingers 12-16. The opening and closing of fingers 12-16 may be provided by a variety of means. However, pursuant to a feature of this invention, finger movement is accomplished by a screw drive coupled to a reversible electric motor 24. Motor 24 is rigidly attached to the end of riser block 26.

The outer ends of fingers 12-16 terminate in a clevis having opposing forked portions 30 and 32. Conventional steady rests include workpiece contact devices such as rollers 34 contained within the confines of the clevis on the longitudinal axis of their respective fingers. Pursuant to the present invention steady rest 10 further includes a second workpiece contact device 36 which is offset from the longitudinal axis of its respective fingers. In the embodiment shown in the drawings, the second workpiece contact device 36 takes the form of a ball bearing roller which is coaxially mounted with roller 34 on a common pin 37 passing through the forked portions 30, 32 of the finger clevis. Metal shims 38 may be employed to space the second roller 36 outwardly a given distance from roller 34. The thickness of shim 38 in the preferred embodiment is approximately the same as the thickness of cover 20 so as to prevent any interference of the housing 18 with the workpiece when the steady rest 10 is used in the internal workpiece supporting mode.

Those skilled in the art will appreciate that the workpiece contact members 36 may be mounted on either or both sides of the workpiece contact member 34. Additionally, various types of rollers can be used having various contact surface configurations. Alternatively, contact members 34, 36 may take the form of plastic disks which are stationarily secured to the pin 37 by set screws (not shown). This type of contact device may be used when extremely accurate machining operations are undertaken in which rollers may not provide consistent backup forces due to their being slightly out of round. Still other alternatives for the contact devices will become apparent to one skilled in the art.

Figure 3:
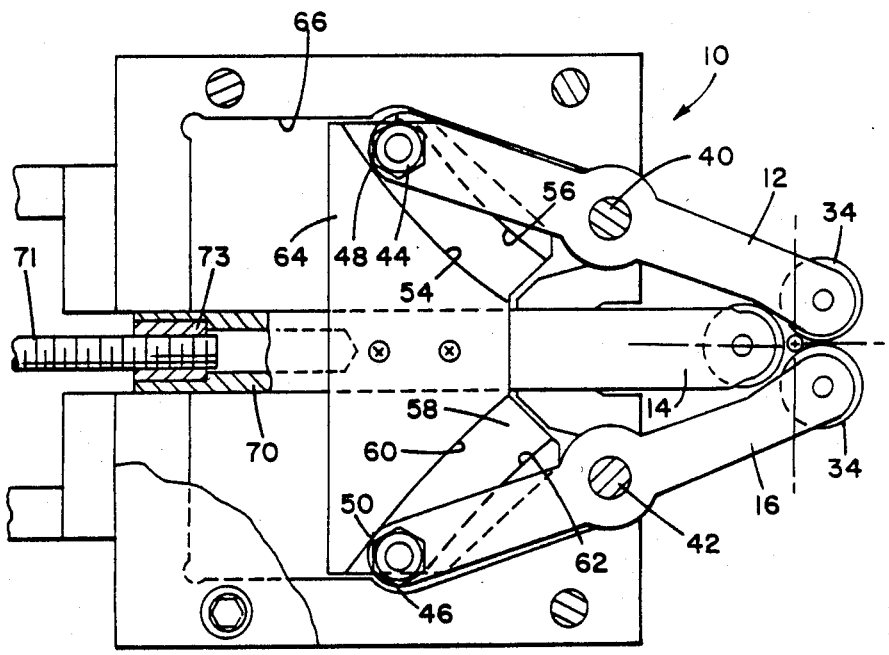
FIG. 3 is a cross-sectional view along the lines 3—3 of FIG. 2 showing the internal camming arrangement of the steady rest with the fingers fully closed.

FIGS. 2-4 show the internal camming arrangement for steady rest 10. The middle portions of upper finger 12 and lower finger 14 are pivoted about pins 40 and 42, respectively. Cam rollers 44 and 46 are transversely mounted via nuts 48 and 50 to the inner ends of fingers 12 and 14, respectively. Cam roller 44 rides in a cam slot 52 defined by opposing arcuately shaped camming surfaces 54 and 56. Similarly, cam roller 46 rides in cam slot 58 defined by opposing arcuately shaped camming surfaces 60 and 62. Slots 52 and 58, in the preferred embodiment, are formed in a side face of cam member 64. Cam member 64 slides back and forth in a cavity 66 formed within housing 18 between the two outer cover plates 20 and 22.

The center finger 14 is formed by the projection of a center slide 70. The interior end of slide 70 is hollow and adapted to receive screw drive 71 connected to motor 24. A nut 73 screwed or otherwise fastened to slide 70 has its inner threads mating with the outer threads of screw drive 71. Middle portions of slide 70 are connected to cam member 64, for example, by way of screws 74 and 76. In such a manner, center slide 70 and cam member 64 move back and forth within cavity 66 in unison under the control of electric motor 24. Clockwise rotation of screw drive 71 causes nut 73 to travel in one direction carrying slide 70 with it, while counter-clockwise rotation of screw drive 71 moves the slide 70 in the opposite direction.

FIGS. 2-3 illustrate steady rest 10 in the finger closed position where the cam 64 is in its most forward position. FIG. 4, on the other hand, shows the fingers in the full open position with the cam member 64 retracted. Some of the construction details of the camming arrangement can be changed, if desired. For example, cam mamber 64 can be broken up into two pieces, one for the upper finger and one for the lower finger. Also, the center slide may be divided into separate pieces and attached to the front and rear portions of the cam(s). Various other constructions will become apparent to one skilled in the art. All that really is important is that the motive source cause all of the fingers to move in unison. It is also important, pursuant to one aspect of this invention, that each cam slot is defined by double opposing cam surfaces for the inner ends of the upper and lower fingers. This is quite unlike one known construction in which a cam with only the inner cam surface (i.e. 54 or 60) is provided. By having the cam rollers on the fingers riding in a well defined slot with opposing camming surfaces, the outer ends of the fingers are held rigidly in place. The opposing camming surfaces provide backup support to counteract forces acting on the outer ends of the fingers. If the force acts on the outer rollers in an inside-out manner (as would be the case when externally contacting the workpiece) the camming surfaces 54 and 60 resist those forces and prevent the fingers from "backlashing" or wobbling. Similarly, if the forces act on the outer fingers in an outside-in manner (i.e., when internally contacting the workpiece) the camming surfaces 56 and 62 operate to provide the backup support.

The provision of the screw drive actuator also enables the fingers to provide consistent pressure on the workpiece. The engagement of the threads of nut 73 and screw drive 71 effectively locks the fingers in place and resists counteracting pressures from the workpiece. Motor 24 is preferably energized during the machining operation to continually apply a small amount of positive tension on screw drive 71 to insure finger engagement with the workpiece.

Figure 6:
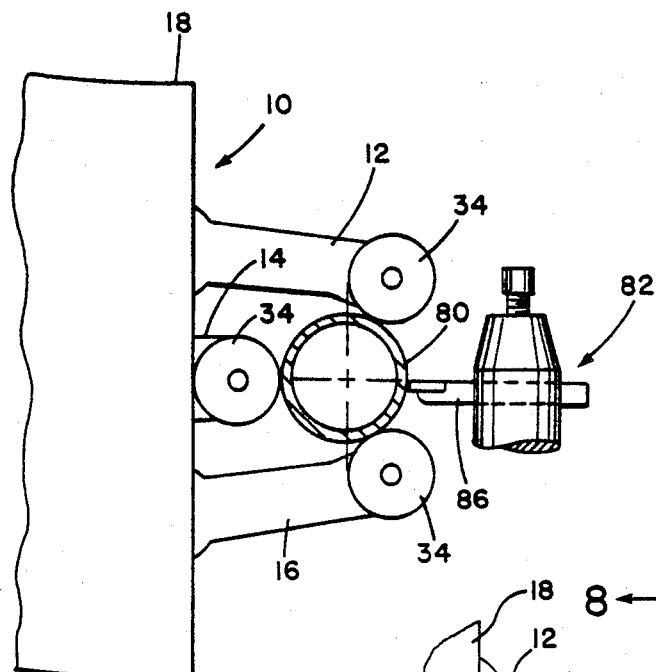
FIG. 6 is a side view of FIG. 5.

FIGS. 5 and 6 illustrate the use of steady rest 10 for supporting the external surface of tube 80 during a turning operation using a lathe having a tool generally represented by the numeral 82. In this mode of operation the steady rest may be mounted to the same table 84 as the tool holder for tool 86 to thereby follow the tool during the machining operation. Steady rest 10 may be used in any of a wide variety of conventional uses for steady rests where external support of a workpiece is required.

Figure 7:
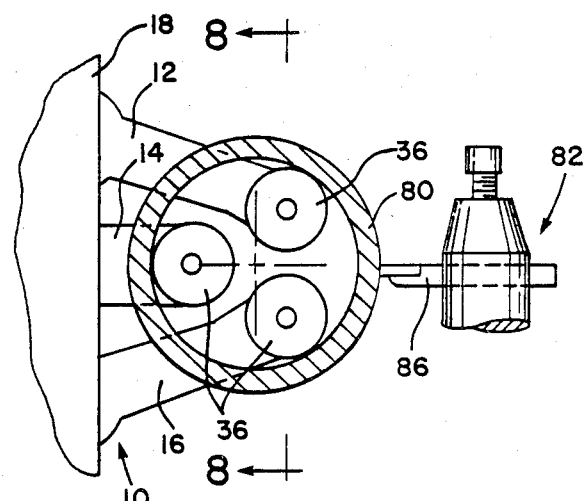
FIG. 7 is a side view showing the steady rest contacting the internal surfaces of a tubular workpiece.
Figure 8:
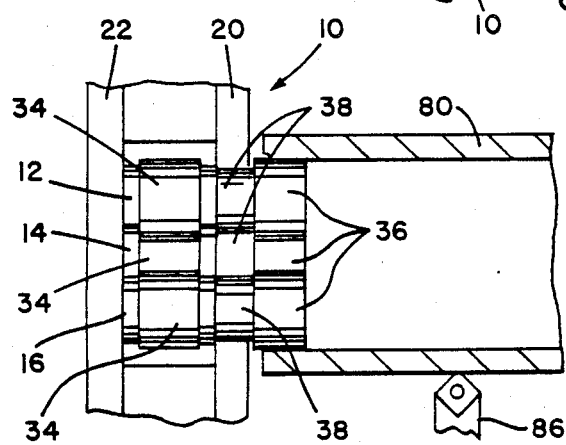
FIG. 8 is a cross-sectional view along the lines 8—8 of FIG. 7.

The steady rest 10 of the present invention is particularly advantageous for use in supporting the internal surfaces of an end of a tubular workpiece as shown in FIGS. 7 and 8. Steady rest 10 in this mode of operation may be permanently mounted where the workpiece is fed through a chuck or collet (not shown) associated with a spindle for rotating the workpiece. In that case the workpiece would be fed through the chuck until the open end of the tube passes over the second set of rollers 36 of the steady rest. Then the electric motor 28 is operated to expand the fingers 12-16 until the rollers 36 come into contact with the inner periphery of the tube. This arrangement allows the cutting tool 86 to make a cut very close to the end of the tube. Analogously, a grinding operation may be performed completely to the end of the tube because the rollers of the steady rest of the present invention will not interfere with the machine tool. The steady rest may also be mounted on a movable support in those instances where the tube must be inserted into one end of a chuck. In those instances the tube would be inserted into the chuck and clamped. Then, the movable support would be brought into position bringing the steady rest into the position shown in FIGS. 7 and 8.

Those skilled in the art should now recognize that the steady rest of the present invention is capable of a multitude of different uses and various modifications of the disclosed embodiment can be made without departing from the spirit of this invention as defined by the following claims.

I claim:

1. In a steady rest of the type including first and second elongate fingers having work contacting ends, control ends, pivoting means intermediate said ends, control means for pivoting the fingers between open and closed positions allowing a maximum or minimum diameter workpiece respectively, a center finger having a work contacting end and a control end, the center finger being slideably mounted between the first and second fingers with the control end in contact with said control means to be operated thereby, a first set of rollers having respective axes of rotation and mounted on the work contacting ends, the axes of said rollers being substantially parallel to one another and within the planes of the respective fingers thereof, wherein the improvement comprises:

a second set of rollers having respective axes of rotation, means mounting said second rollers axially adjacent respective first rollers for rotation about common axes and moveable therewith, all of said first and second rollers having the same diameter so as to allow both sets of rollers contact with an outer periphery of a workpiece and alternatively to allow the second set of rollers contact with an inner periphery of a workpiece.

2. The device of claim 1 wherein the control means comprises a camming member that is reciprocally linearly displaceable.

3. The device of claim 2 wherein the camming member has arcuately shaped camming surfaces and upper and lower cam tracks which engage the control ends of the fingers.

4. The device of claim 2 further including a screw drive connected to control the linear displacement of the camming member.

5. The device of claim 2 further including a nut wherein the control end of the center finger has non-camming contact and is connected to the nut traveling along the screw drive.

* * * * *